United States Patent
Ando et al.

(10) Patent No.: US 10,808,137 B2
(45) Date of Patent: *Oct. 20, 2020

(54) METHOD FOR PRODUCING PRINTED ITEM

(71) Applicant: RISO KAGAKU CORPORATION, Tokyo (JP)

(72) Inventors: Kazuyuki Ando, Ibaraki (JP); Shinichiro Shimura, Ibaraki (JP); Marie Morinaga, Ibaraki (JP); Hikaru Sugiura, Ibaraki (JP); Shinsuke Ozawa, Ibaraki (JP)

(73) Assignee: RISO KAGAKU CORPORATION, Tokyo (JP)

( * ) Notice: Subject to any disclaimer, the term of this patent is extended or adjusted under 35 U.S.C. 154(b) by 105 days.

This patent is subject to a terminal disclaimer.

(21) Appl. No.: 16/141,003

(22) Filed: Sep. 25, 2018

(65) Prior Publication Data

US 2019/0100668 A1   Apr. 4, 2019

(30) Foreign Application Priority Data

Sep. 29, 2017   (JP) ................. 2017-189873

(51) Int. Cl.
| | |
|---|---|
| C09D 11/40 | (2014.01) |
| C09D 11/36 | (2014.01) |
| C09D 11/324 | (2014.01) |
| C09D 11/322 | (2014.01) |
| C09D 11/037 | (2014.01) |
| C09D 11/033 | (2014.01) |
| B41M 5/00 | (2006.01) |
| C09D 11/06 | (2006.01) |
| B41J 2/21 | (2006.01) |

(52) U.S. Cl.
CPC .......... *C09D 11/40* (2013.01); *B41M 5/0023* (2013.01); *C09D 11/033* (2013.01); *C09D 11/037* (2013.01); *C09D 11/06* (2013.01); *C09D 11/322* (2013.01); *C09D 11/324* (2013.01); *C09D 11/36* (2013.01); *B41J 2/2107* (2013.01)

(58) Field of Classification Search
None
See application file for complete search history.

(56) References Cited

U.S. PATENT DOCUMENTS

| | | | |
|---|---|---|---|
| 4,338,133 A | 7/1982 | Toyoda | |
| 5,968,244 A | 10/1999 | Ueda et al. | |
| 5,980,624 A | 11/1999 | Ichikawa et al. | |
| 6,113,679 A | 9/2000 | Adkins | |
| 7,834,072 B2 | 11/2010 | Carlini et al. | |
| 8,038,784 B2* | 10/2011 | Watanabe | C09D 11/326 106/31.74 |
| 8,440,010 B2* | 5/2013 | Endo | C09D 11/54 106/31.26 |
| 8,507,585 B2 | 8/2013 | Hosoya et al. | |
| 9,624,394 B2* | 4/2017 | Endo | C09D 11/10 |
| 9,624,402 B2* | 4/2017 | Shimura | B41J 2/1631 |
| 9,821,568 B2* | 11/2017 | Shimura | B41J 2/2107 |
| 9,845,402 B2* | 12/2017 | Shimura | B41J 2/01 |
| 2003/0220418 A1 | 11/2003 | Horie | |
| 2004/0063811 A1 | 4/2004 | Hone et al. | |
| 2004/0068031 A1 | 4/2004 | Horie | |
| 2004/0265756 A1 | 12/2004 | Hone | |
| 2005/0046675 A1 | 3/2005 | Aoshima | |
| 2005/0119363 A1 | 6/2005 | Yamada et al. | |
| 2006/0189712 A1* | 8/2006 | Kondo | C09D 11/101 523/160 |
| 2007/0022904 A1 | 2/2007 | Kitawaki et al. | |
| 2008/0194754 A1 | 8/2008 | Nakamura | |
| 2009/0090271 A1 | 4/2009 | Wynants et al. | |
| 2009/0263632 A1* | 10/2009 | Kojima | C09D 11/322 428/195.1 |
| 2010/0136234 A1* | 6/2010 | Kobayashi | B41M 5/0023 427/256 |
| 2012/0006225 A1 | 1/2012 | Tsukiana et al. | |

(Continued)

FOREIGN PATENT DOCUMENTS

| | | |
|---|---|---|
| AU | 2012247077 | 11/2012 |
| CN | 104610811 A | 5/2015 |

(Continued)

OTHER PUBLICATIONS

English translation of JPH 04/248879, Sep. 1993; 13 pages.*
English translation of JP 2004/217703, Aug. 2004; 9 pages.*
English translation of JP 2010/064478, Mar. 2010; 40 pages.*
"Development of a Three-Dimensional Bioprinter: Construction of a Cell Supporting Structures Using Hydrogel and State-Of-The-Art Inkjet Technology" by Nishiyama et al.; J. Biomechanical Engineering, 131(3): 035001, Mar. 2009; 6 pages.*
"Silicone Fluid KF-96" from Shin-Etsu Chemical Co., Ltd.; shinetsusilicone-global.com/catalog/pdf/kf96_e.pdf. 2004; 36 pages.
Mar. 11, 2020 Office Action in copending U.S. Appl. No. 15/904,478, filed Feb. 26, 2018.

(Continued)

*Primary Examiner* — Helene Klemanski

(74) *Attorney, Agent, or Firm* — Greenblum & Bernstein, P.L.C.

(57) ABSTRACT

A method for producing a printed item including discharging two or more inks by an inkjet method toward a recording medium to form an image is disclosed, wherein the two or more inks include a first oil-based inkjet ink containing a first colorant and a non-aqueous solvent and having an ink surface tension of less than 27.0 mN/m, and a second oil-based inkjet ink containing a second colorant and a non-aqueous solvent and having an ink surface tension of 27.0 mN/m or greater, and the method includes discharging the first oil-based inkjet ink toward the recording medium at a discharge volume of at least 20 pl per one liquid droplet to form dots with the first oil-based inkjet ink, and subsequently discharging the second oil-based inkjet ink toward the recording medium at a discharge volume of less than 20 pl per one liquid droplet so as to overlap with the dots formed with the first oil-based inkjet ink.

6 Claims, No Drawings

(56) References Cited

U.S. PATENT DOCUMENTS

| | | | |
|---|---|---|---|
| 2012/0048141 | A1 | 3/2012 | Arai et al. |
| 2018/0244936 | A1 | 8/2018 | Shimura et al. |
| 2018/0244937 | A1 | 8/2018 | Sugiura et al. |
| 2018/0244938 | A1 | 8/2018 | Morinaga et al. |
| 2018/0244939 | A1* | 8/2018 | Sugiura ................. C09D 11/102 |
| 2018/0244940 | A1* | 8/2018 | Ando ................... C09D 11/102 |
| 2018/0244941 | A1 | 8/2018 | Sugiura et al. |
| 2018/0327617 | A1 | 11/2018 | Inoue et al. |
| 2019/0100002 | A1 | 4/2019 | Ozawa |
| 2019/0100671 | A1* | 4/2019 | Morinaga ............... C09D 11/54 |
| 2019/0134989 | A1* | 5/2019 | Matsumoto ............ C09D 11/38 |
| 2019/0300737 | A1 | 10/2019 | Ozawa |
| 2020/0040206 | A1 | 2/2020 | Sugiura |

FOREIGN PATENT DOCUMENTS

| | | |
|---|---|---|
| CN | 106084984 A | 11/2016 |
| EP | 1493783 | 1/2005 |
| EP | 3093316 | 11/2016 |
| EP | 3 366 737 | 8/2018 |
| EP | 3 366 739 | 8/2018 |
| EP | 3366733 | 8/2018 |
| EP | 3461868 | 4/2019 |
| JP | 01203482 A | 8/1989 |
| JP | H03-292370 | 12/1991 |
| JP | H04-161467 | 6/1992 |
| JP | H04-248879 | 9/1992 |
| JP | 2001-098196 | 4/2001 |
| JP | 2001-342388 | 12/2001 |
| JP | 2004-217703 | 8/2004 |
| JP | 2005-60567 | 3/2005 |
| JP | 2006-307107 | 11/2006 |
| JP | 2006-315363 | 11/2006 |
| JP | 2007-154149 | 6/2007 |
| JP | 2010-1452 | 1/2010 |
| JP | 2010/064478 A * | 3/2010 |
| JP | 2014-19766 | 2/2014 |
| JP | 2016-196564 | 11/2016 |

OTHER PUBLICATIONS

Apr. 9, 2020 Office Action in copending U.S. Appl. No. 15/904,481, filed Feb. 26, 2018.
Apr. 13, 2020 Office Action in copending U.S. Appl. No. 15/904,504, filed Feb. 26, 2018.
Apr. 7, 2020 Office Action in copending U.S. Appl. No. 15/904,476, filed Feb. 26, 2018.
Jan. 11, 2019 Office Action in copending U.S. Appl. No. 15/904,496, filed Feb. 26, 2018.
Office Action in U.S. Appl. No. 15/904,496 dated Sep. 21, 2018.
Official Communication issued in European Patent Office (EPO) Patent Application No. 18 158 557.1 dated Sep. 5, 2019.
Apr. 15, 2020 Office Action in copending U.S. Appl. No. 16/141,054, filed Sep. 25, 2018.
Extended European Search Report from European Patent Office (EPO) in European Patent Appl. No. 18192237.8, dated Mar. 14, 2019.
Catalogue of Organic Modified Silicone, Dow Corning Toray Co., Ltd., in Japanese, with English Translation of p. 10 (2016).
"Silicon Compounds: Silanes and Silicones," *GELEST, Inc. Gelest, A Survey of Properties and Chemistry*, 3$^{rd}$ Edition, edited by Barry Arkles & Gerald L. Larson, Morrisville, PA, 608 pages (2013).
English translation of JP 01/203482, Aug. 1989; 6 pages.
English translation of JP 2016/196564, Nov. 2016; 29 pages.
English translation of JPH 03/292370, Dec. 1991; 6 pages.
English translation of JP 2001/098196, Apr. 2001; 12 pages.
English translation of JP 2006/307107, Nov. 2006; 28 pages.
"Reactive and Nonreactive Silicone Fluid" from Shin-Etsu Chemical Co., Ltd., shinetsusilicone-global.com/catalog/pdf/modified e.pdf, 2006; 10 pages.
"Phenyl Methyl Silicon Fluid" www.organosilicon.com/en/68083-14-7.htm, no date available; 1 page.
Apr. 13, 2020 Office Action in copending U.S. Appl. No. 15/904,508, filed Feb. 26, 2018.
European Search Report issued with respect to Application No. 18158568.8, dated May 24, 2018.
European Search Report issued with respect to Application No. 18158557.1, dated May 24, 2018.
European Search Report issued with respect to Application No. 18158565.4, dated Jun. 1, 2018.
European Search Report issued with respect to Application No. 18158577.9, dated Jun. 21, 2018.
European Search Report issued with respect to Application No. 18158573.8, dated Jul. 18, 2018.
European Search Report issued with respect to Application No. 18158552.2, dated May 17, 2018.
Official Action dated Aug. 5, 2020 in the counterpart Chinese application No. 201810159232.X with translation.
Latest Practical Manual of Printing Technology, Letterpress Printing Technology Bulletin, Guangzhou, Tibet, p. 119, Hefei: Anhui Audio-Visual Publishing House, Nov. 2003. See #1, the English translation of SIPO's Office Action at pp. 4-5 as a concise explanation of pertinence of this non-patent literature.
"Silicone Production and Application Technology", Institute of Scientific and Technological Information, Ministry of Chemical Industry, p. 86 Institute of Scientific and Technological Information, Ministry of Chemical Industry, Dec. 1985. See #1, the English translation of SIPO's Office Action at pp. 4-5 as a concise explanation of pertinence of this non-patent literature.
"Modern Fine Chemical Technology and Product Synthesis Processes", Kwong Shenglu, pp. 273-274, Beijing: Science and Technology Literature Publishing House, Dec. 1997. See #1, the English translation of SIPO's Office Action at pp. 4-5 as a concise explanation of pertinence of this non-patent literature.

\* cited by examiner

METHOD FOR PRODUCING PRINTED ITEM

CROSS REFERENCE TO RELATED APPLICATIONS

This application is based upon and claims the benefit of priority from the prior Japanese Patent Application No. 2017-189873, filed on Sep. 29, 2017, the entire contents of which are incorporated by reference herein.

BACKGROUND OF THE INVENTION

Field of the Invention

Embodiments of the present invention relate to a method for producing a printed item.

Description of the Related Art

The inkjet recording method is a method in which an inkjet ink of high fluidity is jetted from fine nozzles in the form of liquid droplets, thereby recording an image on a recording medium positioned facing the nozzles, and because this method enables high-speed printing to be conducted with little noise, it has rapidly become widespread in recent years. Examples of known types of inks that can be used in this type of inkjet recording method include aqueous inks which contain water as the main solvent, ultraviolet-curable inks (UV inks) which contain a large amount of a polymerizable monomer as the main component, hot melt inks (solid inks) which contain a large amount of a wax as the main component, and so-called non-aqueous inks which contain a non-aqueous solvent as the main solvent. Non-aqueous inks can be classified into solvent-based inks in which the main solvent is a volatile organic solvent, and oil-based inks in which the main solvent is an organic solvent having either low volatility or no volatility. Solvent-based inks mainly dry on the recording medium as a result of evaporation of the organic solvent, whereas oil-based inks mainly dry as a result of penetration into the recording medium.

With oil-based inks, because the colorant penetrates readily into the interior of the recording medium, the print density may be more likely to be low.

JP 2010-1452 A aims to provide a non-aqueous pigment ink that suppresses show-through in printed items, improves print density and exhibits excellent storage stability, and proposes a non-aqueous pigment ink containing non-aqueous resin dispersion particles that have a specific structure and exhibit a pigment dispersion function.

SUMMARY OF THE INVENTION

An embodiment of the present invention provides a method for producing a printed item including discharging two or more inks by an inkjet method toward a recording medium to form an image, wherein the two or more inks include a first oil-based inkjet ink containing a first colorant and a non-aqueous solvent and having an ink surface tension of less than 27.0 mN/m, and a second oil-based inkjet ink containing a second colorant and a non-aqueous solvent and having an ink surface tension of 27.0 mN/m or greater, and the method includes discharging the first oil-based inkjet ink toward the recording medium at a discharge volume of at least 20 pl per one liquid droplet to form dots with the first oil-based inkjet ink, and subsequently discharging the second oil-based inkjet ink toward the recording medium at a discharge volume of less than 20 pl per one liquid droplet so as to overlap with the dots formed with the first oil-based inkjet ink.

DETAILED DESCRIPTION OF THE EMBODIMENTS

Embodiments of the present invention are described below, but the following embodiments in no way limit the present invention.

In the following description, an oil-based inkjet ink is sometimes referred to as simply an "ink". Further, the first oil-based inkjet ink is sometimes referred to as "the first ink", and the second oil-based inkjet ink is sometimes referred to as "the second ink".

Even if the print density of a solid image can be improved, sharp fine text can sometimes not be obtained.

One object of an embodiment of the present invention is to provide a method for producing a printed item that can suppress show-through in printed items, and can also improve the sharpness of fine text.

A method for producing a printed item according to an embodiment is a method for producing a printed item including discharging two or more inks by an inkjet method toward a recording medium to form an image, wherein the two or more inks include a first oil-based inkjet ink containing a first colorant and a non-aqueous solvent and having an ink surface tension of less than 27.0 mN/m, and a second oil-based inkjet ink containing a second colorant and a non-aqueous solvent and having an ink surface tension of 27.0 mN/m or greater, and the method includes discharging the first oil-based inkjet ink toward the recording medium at a discharge volume of at least 20 pl per one liquid droplet to form dots with the first oil-based inkjet ink, and subsequently discharging the second oil-based inkjet ink toward the recording medium at a discharge volume of less than 20 pl per one liquid droplet so as to overlap with the dots formed with the first oil-based inkjet ink.

According to this method for producing a printed item, show-through in printed items may be suppressed, and the sharpness of fine text may be improved.

Although not constrained by any particular theory, the reasons for this are thought to include the following.

The first ink having an ink surface tension of less than 27.0 mN/m has a low surface tension, and therefore tends to spread immediately upon impact with the recording medium. As a result, fixation of the colorant to the recording medium may occur rapidly, and blurring of the colorant together with the solvent may be prevented, meaning the sharpness of fine text may be favorable. Further, the colorant can be dispersed uniformly inside the dots, and therefore penetration of the colorant into the interior of the recording medium may be suppressed and show-through can be suppressed. Ensuring that the discharge volume per one liquid droplet is less than 20 pl for the second ink also makes it easier to suppress show-through. In contrast, if the surface tension of the first ink is high, then the ink tends to take time to spread following impact on the recording medium. Consequently, blurring of the colorant together with the solvent tends to occur, meaning the sharpness of fine text tends to deteriorate. Moreover, if the discharge volume of the first ink is high, then the proportion of ink that penetrates into the recording medium increases, and show-through tends to worsen.

Furthermore, it is thought that if the dots of the first ink and the dots of the second ink overlap, the density of the colorants in the dots may increase, enabling an improvement in the sharpness of fine text. On the other hand, it is thought that the overlap of the ink dots may also be affected by the spreading characteristics of the inks and the ink impact position accuracy. In a case in which the first ink is discharged toward the recording medium to form dots with the first ink, and the second ink is then discharged toward the recording medium so as to overlap with the dots formed with the first ink, then as described below, the dots of the first ink and the dots of the second ink can be more easily overlapped when the surface tensions and discharge volumes of the inks are set to prescribed values.

By setting the discharge volume per one liquid droplet to at least 20 pl for the first ink, the liquid droplet size is comparatively large, and therefore the liquid droplets are less affected by air flow, meaning the impact position accuracy for the first ink can be enhanced. Further, as described above, the first ink has a low surface tension and may spread easily. In contrast, the subsequently discharged second ink has a discharge volume per one liquid droplet that is less than 20 pl, and because the liquid droplet size is small, the liquid droplets may be more easily affected by air flow, meaning the impact position accuracy tends to be lower. However, because the dots formed by the previously discharged first ink have spread, even if the impact position accuracy for the second ink is somewhat lower, the dots of the second ink can still be easily overlapped with the dots of the first ink. Further, because the surface tension of the second ink is 27.0 mN/m or greater, the ink droplets of the second ink are unlikely to become excessively small, and therefore the problem of the ink droplets of the second ink being excessively affected by air flow leading to an excessive deterioration in the impact position accuracy can be more easily avoided. In this manner, it is thought that the dots of the first ink and the dots of the second ink can be made to overlap more easily. Furthermore, because the second ink undergoes a penetration process into the interior of the recording medium and is ultimately positioned at a lower level in the recording medium than the first ink, if the discharge volume of the second ink is too large, then show-through tends to worsen.

The first ink is described below.

The first ink preferably contains a first colorant and a non-aqueous solvent.

The first ink may contain a pigment, a dye or a combination thereof as the first colorant.

Organic pigments such as azo pigments, phthalocyanine pigments, polycyclic pigments and dye lake pigments, and inorganic pigments such as carbon blacks and metal oxides can be used as the pigment. Examples of the azo pigments include soluble azo lake pigments, insoluble azo pigments and condensed azo pigments. Examples of the phthalocyanine pigments include metal phthalocyanine pigments and metal-free phthalocyanine pigments. Examples of the polycyclic pigments include quinacridone-based pigments, perylene-based pigments, perinone-based pigments, isoindoline-based pigments, isoindolinone-based pigments, dioxazine-based pigments, thioindigo-based pigments, anthraquinone-based pigments, quinophthalone-based pigments, metal complex pigments and diketopyrrolopyrrole (DPP). Examples of the carbon blacks include furnace carbon black, lamp black, acetylene black and channel black. Examples of the metal oxides include titanium oxide and zinc oxide. These pigments may be used individually, or a combination of two or more pigments may be used.

The first ink may, for example, contain a carbon black as the colorant.

The dispersed form of the pigment may include a so-called encapsulated pigment in which the pigment is coated with an oil-insoluble resin, colored resin particles, or a dispersion in which the encapsulated pigment or resin particles are dispersed using a pigment dispersant, but a dispersion of a so-called self-dispersing pigment in which a functional group is chemically bonded to the pigment surface, or a dispersion obtained by adsorbing a pigment dispersant directly to the pigment surface is preferable.

From the viewpoints of discharge stability and storage stability, the average particle diameter of the pigment is preferably not more than 300 nm, more preferably not more than 200 nm, and even more preferably 150 nm or less.

The amount of the pigment is typically from 0.01 to 20% by mass relative to the total mass of the ink, and from the viewpoints of print density and ink viscosity, is preferably from 1 to 15% by mass, and more preferably from 5 to 10% by mass.

In order to ensure stable dispersion of the pigment in the ink, a pigment dispersant may be used together with the pigment.

Examples of pigment dispersants that can be used favorably include hydroxyl group-containing carboxylate esters, salts of long-chain polyaminoamides and high-molecular weight acid esters, salts of high-molecular weight polycarboxylic acids, salts of long-chain polyaminoamides and polar acid esters, high-molecular weight unsaturated acid esters, copolymers of vinylpyrrolidone and long-chain alkenes, modified polyurethanes, modified polyacrylates, polyether ester anionic surfactants, polyoxyethylene alkyl phosphate esters, and polyester polyamines.

Examples of commercially available pigment dispersants include Antaron V216 (a vinylpyrrolidone-hexadecene copolymer) and V220 (a vinylpyrrolidone-eicosene copolymer) (both product names), manufactured by ISP Japan Ltd.;

Solsperse 13940 (a polyester amine-based dispersant), 16000, 17000 and 18000 (fatty acid amine-based dispersants), and 11200, 24000 and 28000 (all product names), manufactured by The Lubrizol Corporation;

Efka 400, 401, 402, 403, 450, 451 and 453 (modified polyacrylates) and Efka 46, 47, 48, 49, 4010 and 4055 (modified polyurethanes) (all product names), manufactured by BASF Japan Ltd.;

Disparlon KS-860 and KS-873N4 (polyester amine salts) (both product names), manufactured by Kusumoto Chemicals, Ltd.;

Discol 202, 206, OA-202 and OA-600 (multi-chain polymeric nonionic dispersants) (all product names), manufactured by DKS Co., Ltd.;

DISPERBYK 2155 and 9077 (both product names). manufactured by BYK-Chemie Japan K.K.; and Hypermer KD2, KD3, KD11 and KD12 (all product names), manufactured by Croda Japan K.K.

The amount of the pigment dispersant need only be sufficient to enable satisfactory dispersion of the pigment within the ink, and may be set as appropriate. For example, the pigment dispersant is typically added in a mass ratio within a range from 0.1 to 5, and preferably from 0.1 to 1, relative to a value of 1 for the pigment. The pigment dispersant is typically added in an amount of 0.01 to 10% by mass, and preferably from 0.01 to 5% by mass, relative to the total mass of the ink.

In an oil-based ink, the amount of resin components, including the pigment dispersant, relative to the total mass of the ink, is typically not more than 10% by mass, preferably not more than 7% by mass, and even more preferably 5% by mass or less. This may prevent any increase in the ink viscosity, and may further improve the discharge performance.

For the dye, any of the dyes typically used in this technical field may be used. In the case of an oil-based ink, in a case in which a dye exhibits better affinity with the non-aqueous solvent of the ink, storage stability may be improved. Accordingly, the use of an oil-soluble dye is preferred.

Examples of oil-soluble dyes include azo dyes, metal complex salt dyes, naphthol dyes, anthraquinone dyes, indigo dyes, carbonium dyes, quinoneimine dyes, xanthene dyes, cyanine dyes, quinoline dyes, nitro dyes, nitroso dyes, benzoquinone dyes, naphthoquinone dyes, phthalocyanine dyes and metal phthalocyanine dyes. These dyes may be used individually, or a combination of two or more dyes may be used.

The amount of the dye is typically from 0.01 to 20% by mass relative to the total mass of the ink, and from the viewpoints of print density and ink viscosity, is preferably from 1 to 15% by mass, and more preferably from 5 to 10% by mass.

The first ink preferably contains a non-aqueous solvent. Either a non-polar organic solvent or a polar organic solvent can be used as the non-aqueous solvent. In the present embodiment, a water-insoluble organic solvent that does not mix uniformly with an equal volume of water at 1 atmosphere and 20° C. is preferably used as this non-aqueous solvent.

Although there are no particular limitations on the non-aqueous solvent contained in the first ink, the first ink preferably contains a non-aqueous solvent with which the surface tension of the first ink can be less than 27.0 mN/m. From this viewpoint, the non-aqueous solvent of the first solvent preferably contains, for example, a silicone oil.

A silicone oil is a compound that has a silicon atom and a carbon atom in one molecule, and is liquid at 23° C.

Compounds having a silyl group, compounds having a silyloxy group, and compounds having a siloxane linkage and the like can be used as the silicone oil, and polysiloxane compounds can be used particularly favorably.

Chain-like silicone oils, cyclic silicone oils, and modified silicone oils and the like can be used as the silicone oil.

The chain-like silicone oil is preferably a chain-like polysiloxane having 2 to 30 silicon atoms, more preferably 2 to 20 silicon atoms, and even more preferably 3 to 10 silicon atoms. Examples of the chain-like silicone oils include linear dimethyl silicone oils such as tetradecamethylhexasiloxane and hexadecamethylheptasiloxane, and branched dimethyl silicone oils such as methyltris(trimethylsiloxy)silane and tetrakis(trimethylsiloxy)silane.

The cyclic silicone oil is preferably a cyclic polysiloxane having 5 to 9 silicon atoms, and cyclic dimethyl silicone oils such as decamethylcyclopentasiloxane, dodecamethylcyclohexasiloxane, hexadecamethylcyclooctasiloxane and octadecamethylcyclononasiloxane can be used favorably.

Examples of the modified silicone oils include silicone oils having any of various organic groups introduced at a portion of the silicon atoms of a chain-like or cyclic dimethyl silicone oil. Modified silicone oils in which all of the silicon atoms are bonded solely to carbon atoms or the oxygen atoms of siloxane linkages are preferred. The modified silicone oil is preferably a non-reactive silicone oil. Modified silicone oils in which the constituent atoms do not include atoms other than silicon atoms, carbon atoms, oxygen atoms and hydrogen atoms are preferred.

Examples of compounds that may be used as the modified silicone oil include compounds in which at least one methyl group contained in a chain-like or cyclic dimethyl silicone oil has been substituted with at least one group selected from the group consisting of alkyl groups, carboxylate ester linkage-containing groups, aromatic ring-containing groups and ether linkage-containing groups.

Further, other examples of compounds that may be used as the modified silicone oil include compounds in which at least one silicon atom contained in a chain-like or cyclic dimethyl silicone oil is bonded to a silicon atom of another chain-like or cyclic dimethyl silicone oil via an alkylene group. In these cases, at least one methyl group contained in the chain-like or cyclic dimethyl silicone oils that are linked via the alkylene group may be substituted with at least one group selected from the group consisting of alkyl groups, carboxylate ester linkage-containing groups, aromatic ring-containing groups and ether linkage-containing groups.

Specific examples of the modified silicone oil include alkyl-modified silicone oils, aryl-modified silicone oils such as phenyl-modified silicone oils and aralkyl-modified silicone oils, carboxylate ester-modified silicone oils, alkylene-modified silicone oils, and polyether-modified silicone oils.

In the modified silicone oil, the number of silicon atoms is preferably from 2 to 20, more preferably from 2 to 10, even more preferably from 2 to 6, and most preferably from 3 to 6.

Examples of the alkyl-modified silicone oils include silicone oils having one, or two or more, alkyl groups of 2 to 20 carbon atoms such as an ethyl group, propyl group, n-butyl group, isobutyl group, tert-butyl group, pentyl group, hexyl group, heptyl group, octyl group, isooctyl group, nonyl group, decyl group, dodecyl group, hexadecyl group, tetradecyl group or eicosyl group in one molecule.

Examples of the aryl-modified silicone oils include silicone oils having one, or two or more, functional groups such as a phenyl group, tolyl group, xylyl group, trimethylphenyl group, biphenylyl group, naphthyl group, anthracenyl group, or a functional group in which at least one hydrogen atom of one of these groups has been substituted with an alkyl group, in one molecule.

Examples of phenyl-modified silicone oils include methyl phenyl silicones such as diphenyl dimethicone, trimethylsiloxyphenyl dimethicone, phenyl trimethicone, diphenylsiloxyphenyl trimethicone, trimethylpentaphenyltrisiloxane, and 1,1,1,5,5,5-hexamethyl-3-phenyl-3-(trimethylsilyloxy)trisiloxane.

Examples of the carboxylate ester-modified silicone oils include silicone oils having one, or two or more, alkylcarbonyloxy groups having an alkyl group of 1 to 20 carbon atoms or alkoxycarbonyl groups having an alkoxy group of 1 to 20 carbon atoms in one molecule.

Examples of the modified silicone oil include silicone oils having 2 to 6 silicon atoms in one molecule, having an organic group in which a carbon atom is bonded directly to a silicon atom and in which the total number of carbon atoms and oxygen atoms is at least 4, and having a total number of carbon atoms and oxygen atoms, contained within all of the organic groups in which the total number of carbon atoms and oxygen atoms is at least 4, that is from 4 to 20 within one molecule. In the following description, this type of silicone oil is also referred to as the modified silicone oil S.

The modified silicone oil S may contain one or more groups selected from the group consisting of groups (A) to (D) described below as the organic group in which the total number of carbon atoms and oxygen atoms is at least 4.

(A) Alkyl groups having at least 4 carbon atoms.

(B) Carboxylate ester linkage-containing groups in which the total number of carbon atoms and oxygen atoms is at least 4.

(C) Aromatic ring-containing groups having at least 6 carbon atoms.

(D) Alkylene groups having at least 4 carbon atoms.

For example, one or more compounds selected from the group consisting of compounds (A) to (D) described below can be used as the modified silicone oil S.

(A) Compounds having a main-chain siloxane linkage and an alkyl group having at least 4 carbon atoms, hereafter also referred to as alkyl-modified silicone oils S.

(B) Compounds having a main-chain siloxane linkage and a carboxylate ester linkage-containing group in which the total number of carbon atoms and oxygen atoms is at least 4, hereafter also referred to as ester-modified silicone oils S.

(C) Compounds having a main-chain siloxane linkage and an aromatic ring-containing group having at least 6 carbon atoms, hereafter also referred to as aryl-modified silicone oils S.

(D) Compounds having a siloxane linkage bonded to the carbon atom at one terminal of an alkylene group having at least 4 carbon atoms, and having a silyl group or a siloxane linkage bonded to the carbon atom at the other terminal of the alkylene group, hereafter also referred to as alkylene-modified silicone oils S.

In the modified silicone oil S, the total number of carbon atoms and oxygen atoms contained in all of the organic groups in which the total number of carbon atoms and oxygen atoms is at least 4 is preferably 4 or greater, more preferably 8 or greater, and even more preferably 10 or greater, in one molecule.

In the modified silicone oil S, the total number of carbon atoms and oxygen atoms contained in all of the organic groups in which the total number of carbon atoms and oxygen atoms is at least 4 is preferably not more than 20, more preferably not more than 16, and even more preferably 12 or fewer, in one molecule.

In those cases where one molecule of the modified silicone oil S contains two or more of the organic groups in which the total number of carbon atoms and oxygen atoms is at least 4, the total number of carbon atoms and oxygen atoms, in one molecule, that are contained within all of the organic groups in which the total number of carbon atoms and oxygen atoms is at least 4 refers to the total number of carbon atoms and oxygen atoms contained in the two or more organic groups which each have a total number of carbon atoms and oxygen atoms of at least 4.

The modified silicone oil S is preferably a compound in which the total number of carbon atoms and oxygen atoms, contained within all of the organic groups in which the total number of carbon atoms and oxygen atoms is at least 4, is from 4 to 12 within one molecule.

The modified silicone oil S is preferably a compound in which the total number of carbon atoms and oxygen atoms, contained within all of the organic groups in which the total number of carbon atoms and oxygen atoms is at least 4, is from 8 to 20 within one molecule.

Examples of the modified silicone oil S include silicone oils represented by general formula (X) shown below.

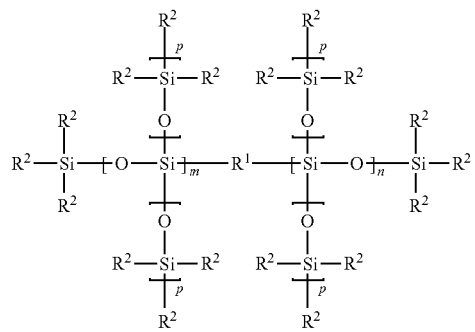

General formula (X)

In general formula (X), $R^1$ represents an oxygen atom or a divalent organic group having a carbon atom bonded directly to a silicon atom, each $R^2$ independently represents a monovalent organic group having a carbon atom bonded directly to a silicon atom, each of m and n independently represents an integer of 0 to 4, each p independently represents an integer of 0 to 2, the number of silicon atoms within one molecule is from 2 to 6, at least one of $R^1$ and $R^2$ is an organic group in which the total number of carbon atoms and oxygen atoms is at least 4, and the total number of carbon atoms and oxygen atoms, contained within all of the organic groups in which the total number of carbon atoms and oxygen atoms is at least 4, is from 4 to 20 within one molecule.

In general formula (X), it is preferable that $R^1$ is an oxygen atom, or a divalent organic group in which the total number of carbon atoms and oxygen atoms is at least 4, and each $R^2$ independently represents a methyl group, or a monovalent organic group in which the total number of carbon atoms and oxygen atoms is at least 4.

It is preferable that in general formula (X), $R^1$ is an oxygen atom or an alkylene group having at least 4 carbon atoms, and each $R^2$ independently represents a methyl group, an alkyl group having at least 4 carbon atoms, a carboxylate ester linkage-containing group in which the total number of carbon atoms and oxygen atoms is at least 4, or an aromatic ring-containing group having at least 6 carbon atoms, wherein at least one of $R^1$ and $R^2$ is a group selected from the group consisting of alkylene groups having at least 4 carbon atoms, alkyl groups having at least 4 carbon atoms, carboxylate ester linkage-containing groups in which the total number of carbon atoms and oxygen atoms is at least 4, and aromatic ring-containing groups having at least 6 carbon atoms, and the total number of carbon atoms and oxygen atoms in one molecule that are contained within all of the alkylene groups having at least 4 carbon atoms, alkyl groups having at least 4 carbon atoms, carboxylate ester linkage-containing groups in which the total number of carbon atoms and oxygen atoms is at least 4, and aromatic ring-containing groups having at least 6 carbon atoms, is from 4 to 20.

Other examples of the modified silicone oil S include silicone oils represented by general formula (X-1) shown below.

General formula (X-1)

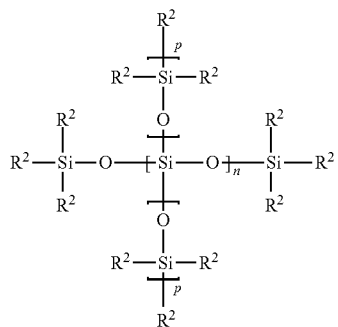

In general formula (X-1), each $R^2$ independently represents a monovalent organic group having a carbon atom bonded directly to a silicon atom, n represents an integer of 0 to 4, each p independently represents 0 or 1, the number of silicon atoms within one molecule is from 2 to 6, at least one $R^2$ is an organic group in which the total number of carbon atoms and oxygen atoms is at least 4, and the total number of carbon atoms and oxygen atoms, contained within all of the organic groups in which the total number of carbon atoms and oxygen atoms is at least 4, is from 4 to 20 within one molecule.

In general formula (X-1), it is preferable that each $R^2$ independently represents a methyl group or a monovalent organic group in which the total number of carbon atoms and oxygen atoms is at least 4.

(A) Alkyl-Modified Silicone Oil S

One embodiment of the modified silicone oil S is a compound having 2 to 6 silicon atoms and an alkyl group having at least 4 carbon atoms, and is preferably a compound having a main-chain siloxane linkage, and an alkyl group having at least 4 carbon atoms in which a carbon atom is bonded directly to a silicon atom of the main chain (namely, an alkyl-modified silicone oil S).

The main-chain siloxane linkage of the alkyl-modified silicone oil S preferably contains 2 to 6 silicon atoms, more preferably 3 to 5 silicon atoms, and even more preferably 3 silicon atoms. For example, the main-chain siloxane linkage is preferably a trisiloxane (having 3 silicon atoms).

A trimethylsilyloxy group or the like may branch from the main-chain siloxane linkage as a side chain.

The alkyl group having at least 4 carbon atoms may be bonded to the silicon atom at either terminal or to the silicon atoms at both terminals of the main-chain siloxane linkage, may be bonded as a side chain, or may be introduced at one or both terminals and as a side chain.

Examples of the alkyl-modified silicone oil S include the following compounds (1) to (4).

(1) Compounds having an alkyl group having at least 4 carbon atoms at one terminal of the main-chain siloxane linkage.

(2) Compounds having an alkyl group having at least 4 carbon atoms at each of the two terminals of the main-chain siloxane linkage.

(3) Compounds having a single alkyl group having at least 4 carbon atoms as a side chain on the main-chain siloxane linkage.

(4) Compounds having two or more alkyl groups having at least 4 carbon atoms as side chains on the main-chain siloxane linkage.

The alkyl group having at least 4 carbon atoms may be chain-like or alicyclic, and may be a linear or branched alkyl group. The alkyl group having at least 4 carbon atoms preferably has 4 to 20 carbon atoms.

The number of carbon atoms in the alkyl group is preferably at least 4, more preferably at least 8, and even more preferably 10 or greater.

The number of carbon atoms in the alkyl group is preferably not more than 20, more preferably not more than 16, and even more preferably 12 or fewer.

Examples of the alkyl group having at least 4 carbon atoms include an n-butyl group, isobutyl group, tert-butyl group, pentyl group, hexyl group, heptyl group, octyl group, isooctyl group, nonyl group, decyl group, dodecyl group, hexadecyl group, tetradecyl group and eicosyl group.

Preferred groups include an octyl group, decyl group, dodecyl group, tetradecyl group and hexadecyl group, and a decyl group or dodecyl group is more preferred.

In the alkyl-modified silicone oil S, the total number of carbon atoms contained in all the alkyl groups of at least 4 carbon atoms in one molecule is preferably at least 4, more preferably at least 8, and even more preferably 10 or greater.

In the alkyl-modified silicone oil S, the total number of carbon atoms contained in all the alkyl groups of at least 4 carbon atoms in one molecule is preferably not more than 20, more preferably not more than 16, and even more preferably 12 or fewer.

In those cases where one molecule of the alkyl-modified silicone oil S contains two or more alkyl groups of at least 4 carbon atoms, the total number of carbon atoms contained in all the alkyl groups of at least 4 carbon atoms in one molecule means the total number of carbon atoms in the two or more alkyl groups of at least 4 carbon atoms.

Examples of the alkyl-modified silicone oil S include compounds represented by general formula (A1) shown below.

General formula (A1)

In general formula (A1), each $R^2$ independently represents a methyl group or an alkyl group having at least 4 carbon atoms, n represents an integer of 0 to 4, each p independently represents 0 or 1, the number of silicon atoms within one molecule is from 2 to 6, at least one $R^2$ is an alkyl group having at least 4 carbon atoms, and the total number of carbon atoms contained within all of the alkyl groups having at least 4 carbon atoms is from 4 to 20 within one molecule.

In the alkyl-modified silicone oil S, the main chain preferably has 3 silicon atoms, and for example, a trisiloxane compound represented by general formula (A2) shown below can be used.

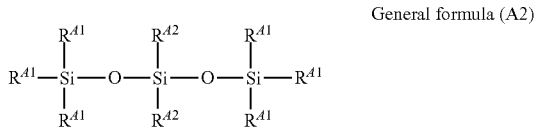

General formula (A2)

In general formula (A2), $R^{A1}$ represents a methyl group or an alkyl group having at least 4 carbon atoms, $R^{A2}$ represents a methyl group, an alkyl group having at least 4 carbon atoms or a trimethylsilyloxy group, at least one $R^{A1}$ or $R^{A2}$ represents an alkyl group having at least 4 carbon atoms, the $R^{A1}$ groups and $R^{A2}$ groups may all be the same, some may be different, or all may be mutually different, and the number of silicon atoms within one molecule is from 2 to 6.

For example, compounds represented by general formula (1) shown below can be used as the alkyl-modified silicone oil S.

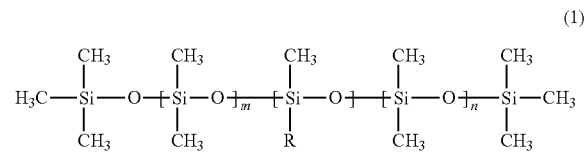

(1)

In general formula (1), R represents a linear or branched alkyl group having 4 to 20 carbon atoms, and each of m and n independently represents an integer of 0 to 2, provided that $m+n \leq 2$.

In general formula (1), R represents a linear or branched alkyl group having 4 to 20 carbon atoms. The number of carbon atoms in the alkyl group represented by R is preferably at least 4, more preferably at least 8, and even more preferably 10 or greater.

The number of carbon atoms in the alkyl group represented by R is preferably not more than 20, more preferably not more than 16, and even more preferably 12 or fewer.

In general formula (1), examples of the alkyl group represented by R include an n-butyl group, isobutyl group, tert-butyl group, pentyl group, hexyl group, heptyl group, octyl group, isooctyl group, nonyl group, decyl group, dodecyl group, tetradecyl group, hexadecyl group and eicosyl group.

Preferred alkyl groups include an octyl group, decyl group, dodecyl group and hexadecyl group, and a decyl group or dodecyl group is more preferred.

The compound represented by general formula (1) is preferably a compound shown below in which both m and n are 0. R is as described above.

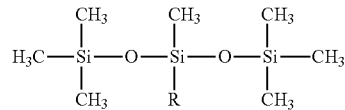

The alkyl-modified silicone oil S described above can be produced using the method described below, but the invention is not restricted to this particular method.

For example, an alkyl-modified silicone oil can be obtained by reacting a siloxane raw material and an alkene having at least 4 carbon atoms in an organic solvent. The siloxane raw material and the alkene are preferably reacted in a molar ratio within a range from 1:1 to 1:1.5. When two or more alkyl groups are to be introduced into the siloxane skeleton, the reaction is preferably performed with a molar ratio between the reactive groups in the siloxane raw material and the alkene that is within a range from 1:1 to 1:1.5. During the reaction, a catalyst such as a platinum catalyst like a zero-valent platinum olefin complex, a zero-valent platinum vinylsiloxane complex, a divalent platinum olefin complex halide or platinic chloride can be used favorably.

For example, by reacting a compound of general formula (1) in which R represents a hydrogen atom as the siloxane raw material, and a linear or branched alkene having 4 to 20 carbon atoms in an organic solvent, a compound represented by general formula (1) can be obtained.

Examples of compounds that can be used as the siloxane raw material include 1,1,1,3,5,5,5-heptamethyltrisiloxane, 1,1,1,3,3,5,7,7,7-nonamethyltetrasiloxane, 1,1,1,3,3,5,7,7,9,9,9-undecamethylpentasiloxane, pentamethyldisiloxane, 1,1,3,3,5,5,5-heptamethyltrisiloxane, 1,1,3,3-tetramethyldisiloxane, 1,1,3,3,5,5-hexamethyltrisiloxane, 1,1,3,3,5,5,7,7-octamethyltetrasiloxane, 1,1,3,3,5,5,7,7,9,9-decamethylpentasiloxane, 1,1,1,5,5,5-hexamethyl-3-(trimethylsilyloxy)trisiloxane, 1,1,1,5,5,5-hexamethyltrisiloxane, 1,1,1,3,5,7,7,7-octamethyltetrasiloxane, 1,1,3,5,5-pentamethyl-3-(dimethylsilyloxy)trisiloxane, and 1,1,3,3,5,5,7,7,9,9,11,11-dodecamethylhexasiloxane.

Examples of alkenes that may be used include 1-butene, 2-butene, 1-pentene, 1-hexene, 1-heptene, 1-octene, 2-octene, 1-nonene, 1-decene, 1-dodecene, 1-hexadecene and 1-eicosene.

Besides alkenes, alicyclic hydrocarbons having an ethylenic unsaturated double bond such as vinylcyclohexane can also be used.

(B) Ester-Modified Silicone Oil S

One embodiment of the modified silicone oil S is a compound having 2 to 6 silicon atoms and a carboxylate ester linkage-containing group in which the total number of carbon atoms and oxygen atoms is at least 4, and is preferably a compound having a main-chain siloxane linkage, and a carboxylate ester linkage-containing group in which a carbon atom is bonded directly to a silicon atom of the main chain and in which the total number of carbon atoms and oxygen atoms is at least 4 (namely, an ester-modified silicone oil S).

The main-chain siloxane linkage of the ester-modified silicone oil S preferably contains 2 to 6 silicon atoms, more preferably 2 to 5 silicon atoms, and even more preferably 3 to 5 silicon atoms. For example, the main-chain siloxane linkage is preferably a trisiloxane (having 3 silicon atoms).

A trimethylsilyloxy group or the like may branch from the main-chain siloxane linkage as a side chain.

The carboxylate ester linkage-containing group may be bonded to the silicon atom at either terminal or to the silicon atoms at both terminals of the main-chain siloxane linkage, may be bonded as a side chain, or may be introduced at one or both terminals and as a side chain.

A group represented by $-R^{Bb}-O-(CO)-R^{Ba}$ or a group represented by $-R^{Bb}-(CO)-O-R^{Ba}$, in which the carboxylate ester linkage is bonded to a silicon atom of the main-chain siloxane linkage via an alkylene group, can be used favorably as the carboxylate ester linkage-containing group.

Here, $R^{Ba}$ is preferably a chain-like or alicyclic alkyl group having at least 1 carbon atom, which may be a linear or branched alkyl group. $R^{Bb}$ is preferably a chain-like or alicyclic alkylene group having at least 1 carbon atom, which may be a linear or branched alkylene group. The alkylene group linking the silicon atom of the main-chain siloxane linkage and the carboxylate ester linkage more preferably has at least 2 carbon atoms.

The total number of carbon atoms and oxygen atoms in the carboxylate ester linkage-containing group is the total of the one carbon atom and two oxygen atoms in the ester linkage (—O—(CO)—), the number of carbon atoms in the alkyl group ($R^{Ba}$), and the number of carbon atoms in the alkylene group ($R^{Bb}$).

The total number of carbon atoms and oxygen atoms in the carboxylate ester linkage-containing group is preferably from 4 to 20.

The total number of carbon atoms and oxygen atoms in the carboxylate ester linkage-containing group is preferably at least 4, more preferably at least 8, and even more preferably 10 or greater.

The total number of carbon atoms and oxygen atoms in the carboxylate ester linkage-containing group is preferably not more than 20, more preferably not more than 16, and even more preferably 12 or fewer.

In the carboxylate ester linkage-containing group, examples of the alkyl group (ea) include a methyl group, ethyl group, propyl group, isopropyl group, n-butyl group, isobutyl group, tert-butyl group, pentyl group, hexyl group, heptyl group, octyl group, isooctyl group, nonyl group, decyl group, dodecyl group, hexadecyl group and heptadecyl group.

Preferred alkyl groups include a pentyl group, heptyl group, nonyl group and tridecyl group, and a heptyl group or nonyl group is more preferred.

In the carboxylate ester linkage-containing group, the alkylene group ($R^{Bb}$) is preferably a linear alkylene group having 1 to 8 carbon atoms, and examples include a methylene group, ethylene group, propylene group, trimethylene group, n-butylene group, isobutylene group, pentylene group, hexylene group, heptylene group, octylene group and isooctylene group. An ethylene group is preferred.

In those cases where one molecule of the ester-modified silicone oil S contains two or more carboxylate ester linkage-containing groups each having a total number of carbon atoms and oxygen atoms of at least 4, the total number of carbon atoms and oxygen atoms contained in all the carboxylate ester linkage-containing groups in one molecule means the total number of carbon atoms and oxygen atoms in the two or more carboxylate ester linkage-containing groups.

Examples of compounds that can be used favorably as the ester-modified silicone oil S include compounds of the above general formula (X-1) in which each $R^2$ independently represents a methyl group or a carboxylate ester linkage-containing group in which a carbon atom is bonded directly to a silicon atom and in which the total number of carbon atoms and oxygen atoms is at least 4, n represents an integer of 0 to 4, each p independently represents 0 or 1, the number of silicon atoms within one molecule is from 2 to 6, at least one $R^2$ is an aforementioned carboxylate ester linkage-containing group, and the total number of carbon atoms and oxygen atoms contained within all of the carboxylate ester linkage-containing groups within one molecule is from 4 to 20.

The ester-modified silicone oil S described above can be produced using the method described below, but the invention is not restricted to this particular method.

For example, the ester-modified silicone oil S can be obtained by reacting a siloxane raw material and a vinyl ester of an aliphatic acid or an allyl ester of an aliphatic acid in which the total number of carbon atoms and oxygen atoms is at least 4 in an organic solvent. The siloxane raw material and the vinyl ester of an aliphatic acid or allyl ester of an aliphatic acid are preferably reacted with a molar ratio between the reactive group in the siloxane raw material and the vinyl ester of an aliphatic acid or allyl ester of an aliphatic acid that is within a range from 1:1 to 1:1.5. During the reaction, a catalyst such as a platinum catalyst like a zero-valent platinum olefin complex, a zero-valent platinum vinylsiloxane complex, a divalent platinum olefin complex halide or platinic chloride can be used favorably.

For the siloxane raw material, the same compounds as those described above for the alkyl-modified silicone oil S can be used.

Examples of vinyl esters of aliphatic acids that may be used include vinyl acetate, vinyl propionate, vinyl butyrate, vinyl isobutanoate, vinyl pentanoate, vinyl pivalate, vinyl hexanoate, vinyl heptanoate, vinyl 2-ethylhexanoate, vinyl octanoate, vinyl isooctanoate, vinyl nonanoate, vinyl decanoate, vinyl laurate, vinyl myristate, vinyl palmitate and vinyl eicosanoate.

An example of an allyl ester of an aliphatic acid that may be used is allyl hexanoate.

(C) Aryl-Modified Silicone Oil S

One embodiment of the modified silicone oil S is a compound having 2 to 6 silicon atoms and an aromatic ring-containing group having a total number of carbon atoms of at least 6, and is preferably a compound having a main-chain siloxane linkage, and an aromatic ring-containing group in which a carbon atom is bonded directly to a silicon atom of the main chain and in which the total number of carbon atoms is at least 6 (namely, an aryl-modified silicone oil S).

The siloxane linkage of the main chain of the aryl-modified silicone oil S preferably contains 2 to 6 silicon atoms, more preferably 3 to 5 silicon atoms, and even more preferably 3 silicon atoms. For example, the main-chain siloxane linkage is preferably a trisiloxane (having 3 silicon atoms).

A trimethylsilyloxy group or the like may branch from the main-chain siloxane linkage as a side chain.

The aromatic ring-containing group may be bonded to the silicon atom at either terminal or to the silicon atoms at both terminals of the main-chain siloxane linkage, may be bonded as a side chain, or may be introduced at one or both terminals and as a side chain.

A group represented by —$R^{Ca}$ in which the aromatic ring is bonded directly to a silicon atom of the main-chain siloxane linkage, or a group represented by —$R^{Cb}$—$R^{Ca}$, in which the aromatic ring is bonded to a silicon atom of the main-chain siloxane linkage via an alkylene group, can be used favorably as the aromatic ring-containing group.

Here, $R^{Ca}$ is preferably an aromatic ring having at least 6 carbon atoms. $R^{Cb}$ is preferably a chain-like or alicyclic alkylene group having at least 1 carbon atom, which may be a linear or branched alkylene group.

When the aromatic ring-containing group is a group represented by —$R^{Ca}$ in which the aromatic ring is bonded directly to a silicon atom of the main-chain siloxane linkage, it is preferable that a trimethylsilyloxy group or the like branches from the main-chain siloxane linkage as a side chain. It is even more preferable that the aromatic ring-containing group is a group represented by —$R^{Cb}$—$R^{Ca}$ in which the aromatic ring is bonded to a silicon atom of the main-chain siloxane linkage via an alkylene group.

The number of carbon atoms in the aromatic ring-containing group is the total of the number of carbon atoms in the aromatic ring ($R^{Ca}$) and the number of carbon atoms in the optional alkylene group ($R^{Cb}$)).

The number of carbon atoms in the aromatic ring-containing group is preferably from 6 to 20.

The number of carbon atoms in the aromatic ring-containing group is preferably at least 6, more preferably at least 8, and even more preferably 10 or greater.

The number of carbon atoms in the aromatic ring-containing group is preferably not more than 20, more preferably not more than 16, and even more preferably 12 or fewer.

In the aromatic ring-containing group, examples of the aromatic ring portion ($R^{Ca}$) include a phenyl group, tolyl group, xylyl group, trimethylphenyl group, biphenylyl group, naphthyl group or anthracenyl group, or a functional group in which at least one hydrogen atom of one of these groups has been substituted with an alkyl group.

The aromatic ring-containing group may contain one, or two or more aromatic rings, but the total number of carbon atoms in all of the aromatic ring-containing groups of at least 6 carbon atoms in one molecule is preferably from 6 to 20.

In the aromatic ring-containing group, the optional alkylene group ($R^{Cb}$) is preferably a linear or branched alkylene group having 1 to 8 carbon atoms, and examples include a methylene group, ethylene group, propylene group, trimethylene group, n-butylene group, isobutylene group, pentylene group, hexylene group, heptylene group, octylene group and isooctylene group.

A propylene group, methylethylene group or ethylene group is preferred.

In the aryl-modified silicone oil S, the total number of carbon atoms contained in all the aromatic ring-containing groups of at least 6 carbon atoms in one molecule is preferably at least 6, more preferably at least 8, and even more preferably 10 or greater.

In the aryl-modified silicone oil S, the total number of carbon atoms contained in all the aromatic ring-containing groups of at least 6 carbon atoms in one molecule is preferably not more than 20, more preferably not more than 16, and even more preferably 12 or fewer.

In those cases where one molecule of the aryl-modified silicone oil S contains two or more aromatic ring-containing groups of at least 6 carbon atoms, the total number of carbon atoms contained in all the aromatic ring-containing groups of at least 6 carbon atoms in one molecule means the total number of carbon atoms in the two or more aromatic ring-containing groups of at least 6 carbon atoms.

Examples of compounds that can be used favorably as the aryl-modified silicone oil S include compounds of the above general formula (X-1) in which each $R^2$ independently represents a methyl group or an aromatic ring-containing group having at least 6 carbon atoms in which a carbon atom is bonded directly to the silicon atom, n represents an integer of 0 to 4, each p independently represents 0 or 1, the number of silicon atoms within one molecule is from 2 to 6, at least one $R^2$ is an aforementioned aromatic ring-containing group, and the total number of carbon atoms contained within all of the aromatic ring-containing groups within one molecule is from 6 to 20.

The aryl-modified silicone oil S described above can be produced using the method described below, but the invention is not restricted to this particular method.

For example, an aryl-modified silicone oil S can be obtained by reacting a siloxane raw material and an aryl compound of 6 to 20 carbon atoms having a carbon double bond in an organic solvent. The siloxane raw material and the aryl compound are preferably reacted with a molar ratio between the reactive group in the siloxane raw material and the carbon double bond in the aryl compound that is within a range from 1:1 to 1:1.5. During the reaction, a catalyst such as a platinum catalyst like a zero-valent platinum olefin complex, a zero-valent platinum vinylsiloxane complex, a divalent platinum olefin complex halide or platinic chloride can be used favorably.

For the siloxane raw material, the same compounds as those described above for the alkyl-modified silicone oil S can be used.

Examples of aryl compounds having a carbon double bond that may be used include styrene, 4-methylstyrene, 2-methylstyrene, 4-tert-butylstyrene, allylbenzene, 1-allylnaphthalene, 4-phenyl-1-butene, 2,4-diphenyl-4-methyl-1-pentene, 1-vinylnaphthalene, α-methylstyrene, 2-methyl-1-phenylpropene, 1,1-diphenylethylene, triphenylethylene, 2,4,6-trimethylstyrene, cis-β-methylstyrene, and trans-β-methylstyrene.

(D) Alkylene-Modified Silicone Oil S

One embodiment of the modified silicone oil S is a compound having 2 to 6 silicon atoms and an alkylene group having at least 4 carbon atoms, and is preferably a compound having a siloxane linkage bonded to the carbon atom at one terminal of an alkylene group having at least 4 carbon atoms, and having a silyl group or a siloxane linkage bonded to the carbon atom at the other terminal of the alkylene group (namely, an alkylene-modified silicone oil S).

The alkylene-modified silicone oil S preferably contains 2 to 6 silicon atoms, more preferably 3 to 5 silicon atoms, and even more preferably 4 silicon atoms.

In the alkylene-modified silicone oil S, the silyl group or siloxane linkage at one terminal of the alkylene group preferably contains 1 to 5 silicon atoms, more preferably 1 to 4 silicon atoms, and even more preferably 2 or 3 silicon atoms.

When the alkylene-modified silicone oil S has a siloxane linkage having 3 or more silicon atoms at one terminal of the alkylene group, a trimethylsilyloxy group or the like may branch from the main-chain siloxane linkage as a side chain.

The alkylene group having at least 4 carbon atoms may be chain-like or alicyclic, and may be a linear or branched alkylene group. The alkylene group having at least 4 carbon atoms preferably has 4 to 20 carbon atoms.

The number of carbon atoms in the alkylene group is preferably at least 4, and more preferably at least 8.

The number of carbon atoms in the alkylene group is preferably not more than 20, more preferably not more than 12, and even more preferably 10 or fewer.

Examples of the alkylene group having at least 4 carbon atoms include an n-butylene group, isobutylene group, pentylene group, hexylene group, heptylene group, octylene group, isooctylene group, nonylene group, decylene group, dodecylene group, hexadecylene group and eicosylene group.

An octylene group, decylene group or dodecylene group is preferred, and an octylene group or decylene group is more preferred.

Examples of compounds that can be used favorably as the alkylene-modified silicone oil S include compounds of the above general formula (X) in which $R^1$ represents an alkylene group having at least 4 carbon atoms, $R^2$ represents a methyl group, each of m and n independently represents an integer of 0 to 4, each p independently represents an integer of 0 to 2, and the number of silicon atoms within one molecule is from 2 to 6.

The alkylene-modified silicone oil S described above can be produced using the method described below, but the invention is not restricted to this particular method.

For example, an alkylene-modified silicone oil S can be obtained by reacting a siloxane raw material and a diene compound having 4 to 20 carbon atoms in an organic solvent. The siloxane raw material and the diene compound are preferably reacted in a molar ratio within a range from 2:1 to 3:1. During the reaction, a catalyst such as a platinum catalyst like a zero-valent platinum olefin complex, a zero-valent platinum vinylsiloxane complex, a divalent platinum olefin complex halide or platinic chloride can be used favorably.

For the siloxane raw material, the same compounds as those described above for the alkyl-modified silicone oil S can be used.

Examples of diene compounds that may be used include 1,3-butadiene, 1,3-pentadiene, 1,4-pentadiene, 1,5-hexadiene, 1,6-heptadiene, 1,7-octadiene, 1,8-nonadiene, 1,9-decadiene, 1,11-dodecadiene, 1,10-undecadiene, 1,13-tetradecadiene, hexadecadiene, and eicosadiene.

Examples of commercially available products that may be used as the silicone oil include "KF-96L-2CS", "KF-96L-5CS" and "KF-56A" manufactured by Shin-Etsu Chemical Co., Ltd., "DC246 Fluid", "DC345 Fluid", "FZ-3196" and "SS-3408" manufactured by Dow Corning Toray Co., Ltd., and "1,1,1,5,5,5-hexamethyl-3-phenyl-3-(trimethylsilyloxy) trisiloxane", "decamethylcyclopentasiloxane" and "dodecamethylcyclohexasiloxane" manufactured by Tokyo Chemical Industry Co., Ltd.

A single silicone oil may be used alone, or a combination of a plurality of silicone oils may be used.

In those cases where the first ink contains a silicone oil, the amount of the silicone oil in the first ink, relative to the total mass of non-aqueous solvent in the first ink, is preferably at least 15% by mass, more preferably at least 20% by mass, and even more preferably 25% by mass or greater. The amount of the silicone oil in the first ink, relative to the total mass of non-aqueous solvent in the first ink, may be 100% by mass, and may be any amount not more than 100% by mass.

In those cases where the first ink contains a silicone oil, the amount of the silicone oil in the first ink relative to the total mass of the first ink varies depending on the total amount of non-aqueous solvent used, but is preferably at least 5% by mass, more preferably at least 10% by mass, even more preferably at least 15% by mass, even more preferably at least 20% by mass, and even more preferably 25% by mass or greater. The amount of the silicone oil in the first ink relative to the total mass of the first ink may be, for example, not more than 90% by mass.

Non-aqueous solvents other than silicone-based solvents are described below.

Examples of preferred non-polar organic solvents include petroleum-based hydrocarbon solvents such as aliphatic hydrocarbon solvents, alicyclic hydrocarbon solvents and aromatic hydrocarbon solvents.

Examples of the aliphatic hydrocarbon solvents and alicyclic hydrocarbon solvents include paraffin-based, isoparaffin-based, and naphthene-based non-aqueous solvents. Specific examples of preferred commercially available products include No. 0 Solvent L, No. 0 Solvent M, No. 0 Solvent H, Cactus Normal Paraffin N-10, Cactus Normal Paraffin N-11, Cactus Normal Paraffin N-12, Cactus Normal Paraffin N-13, Cactus Normal Paraffin N-14, Cactus Normal Paraffin N-15H, Cactus Normal Paraffin YHNP, Cactus Normal Paraffin SHNP, Isosol 300, Isosol 400, Teclean N-16, Teclean N-20, Teclean N-22, AF Solvent No. 4, AF Solvent No. 5, AF Solvent No. 6, AF Solvent No. 7, Naphtesol 160, Naphtesol 200 and Naphtesol 220 (all manufactured by JXTG Nippon Oil & Energy Corporation); Isopar G, Isopar H, Isopar L, Isopar M, Exxsol D40, Exxsol D60, Exxsol D80, Exxsol D95, Exxsol D110 and Exxsol D130 (all manufactured by Exxon Mobil Corporation); and MORESCO White P-40, MORESCO White P-60, MORESCO White P-70, MORESCO White P-80, MORESCO White P-100, MORESCO White P-120, MORESCO White P-150, MORESCO White P-200, MORESCO White P-260 and MORESCO White P-350P (all manufactured by MORESCO Corporation).

Examples of preferred aromatic hydrocarbon solvents include Grade Alkene L and Grade Alkene 200P (both manufactured by JXTG Nippon Oil & Energy Corporation), and Solvesso 100, Solvesso 150, Solvesso 200 and Solvesso 200ND (manufactured by Exxon Mobil Corporation).

The initial boiling point of the petroleum-based hydrocarbon solvent is preferably at least 100° C., more preferably at least 150° C., and even more preferably 200° C. or higher. The initial boiling point can be measured in accordance with JIS K0066 "Test Methods for Distillation of Chemical Products".

Examples of polar organic solvents that can be used favorably include ester-based solvents such as fatty acid ester-based solvents, higher alcohol-based solvents and higher fatty acid-based solvents.

Specific examples include fatty acid ester-based solvents having at least 13 carbon atoms, and preferably 16 to 30 carbon atoms, within one molecule, such as isononyl isononanoate, isodecyl isononanoate, isotridecyl isononanoate, methyl laurate, isopropyl laurate, hexyl laurate, isopropyl myristate, isopropyl palmitate, hexyl palmitate, isooctyl palmitate, isostearyl palmitate, methyl oleate, ethyl oleate, isopropyl oleate, butyl oleate, hexyl oleate, methyl linoleate, ethyl linoleate, isobutyl linoleate, butyl stearate, hexyl stearate, isooctyl stearate, isopropyl isostearate, 2-octyldecyl pivalate, methyl soybean oil, isobutyl soybean oil, methyl tallate, isobutyl tallate, and neopentyl glycol diethylhexanoate;

higher alcohol-based solvents having at least 6 carbon atoms, and preferably 12 to 20 carbon atoms, within one molecule, such as decanol, isomyristyl alcohol, isopalmityl alcohol, isostearyl alcohol, oleyl alcohol, isoeicosyl alcohol and decyltetradecanol; and higher fatty acid-based solvents having at least 12 carbon atoms, and preferably 14 to 20 carbon atoms, within one molecule, such as lauric acid, isomyristic acid, palmitic acid, isopalmitic acid, α-linolenic acid, linoleic acid, oleic acid and isostearic acid.

Examples of ester-based solvents other than fatty acid ester-based solvents include triphenyl phosphate, triethyl phosphate, tributyl phosphate and trioctyl phosphate.

Other examples of polar organic solvents include glycol ether-based solvents, amine-based solvents, and allyl ether-based solvents.

Examples of the glycol ether-based solvents include triethylene glycol monobutyl ether, ethylene glycol monobutyl ether, ethylene glycol mono-tert-butyl ether, diethylene glycol monobutyl ether, and diethylene glycol mono-tert-butyl ether.

Examples of the amine-based solvents include ethanolamine, morpholine and octylamine.

Examples of the allyl ether-based solvents include glycerol monoallyl ether and ethylene glycol monoallyl ether.

The boiling point of these polar organic solvents is preferably at least 150° C., more preferably at least 200° C., and even more preferably 250° C. or higher. These non-aqueous solvents having a boiling point of 250° C. or higher also include non-aqueous solvents that do not exhibit an actual boiling point.

In the first ink, these non-aqueous solvents may be used individually, or a combination of two or more solvents may be used, provided the solvents form a single phase.

In the first ink, although there are no particular limitations on the amount of petroleum-based hydrocarbon solvents, ester-based solvents, higher alcohol-based solvents, higher fatty acid-based solvents, glycol ether-based solvents, amine-based solvents and allyl ether-based solvents, the amount of these solvents relative to the total mass of non-aqueous solvent in the first ink is preferably not more than 85% by mass, more preferably not more than 80% by mass, and even more preferably 75% by mass or less.

The amount of non-aqueous solvent in the first ink relative to the total mass of the first ink is, for example, preferably at least 40% by mass, more preferably at least 60% by mass, and even more preferably 80% by mass or greater. The amount of non-aqueous solvent in the first ink relative to the total mass of the first ink is typically not more than 95% by mass.

In addition to the various components described above, the first ink may also include one or more of various additives, provided these additives do not impair the effects of the present invention. Additives such as nozzle blockage inhibitors, antioxidants, conductivity modifiers, viscosity modifiers, surface tension regulators, and oxygen absorbers and the like may be added as appropriate. There are no particular limitations on the types of these additives, and materials typically used in this technical field may be used.

The first ink can be produced by mixing the various components including the colorant and the non-aqueous solvent.

The first ink is preferably produced by mixing and stirring the components together, either in a single batch or in a number of separate batches. Specifically, the ink can be produced by dispersing all of the components in a dispersion device such as a beads mill, either in a single batch or in a number of separate batches, and then, if desired, passing the resulting dispersion through a filtration device such as a membrane filter.

From the viewpoints of suppressing show-through and improving the sharpness of fine text, the surface tension of the first ink is preferably less than 27.0 mN/m.

From the viewpoint of further improving the sharpness of fine text, the surface tension of the first ink is more preferably not more than 26.0 mN/m, even more preferably less than 26.0 mN/m, and even more preferably 25.0 mN/m or less. Further, from the viewpoint of further improving the sharpness of fine text, the surface tension of the first ink is preferably at least 19.0 mN/m, more preferably at least 20.0 mN/m, and even more preferably 22.0 mN/m or greater. For example, the surface tension of the first ink is preferably at least 19.0 mN/m but not more than 26.0 mN/m, and is more preferably at least 22.0 mN/m but not more than 26.0 mN/m.

The surface tension of each ink can be determined by the maximum bubble pressure method. For example, the surface tension can be measured using the Science Line t60 device manufactured by SITA Process Solutions of SITA Messtechnik GmbH.

The viscosity of the first ink at 23° C., in the case of an inkjet application, is preferably within a range from 5 to 30 mPa·s, more preferably from 5 to 15 mPa·s, and even more preferably about 10 mPa·s.

Although there are no particular limitations on the color of the first ink, the first ink is preferably a black ink.

The second ink is described below.

The second ink preferably contains a second colorant and a non-aqueous solvent.

The second ink may contain a pigment, a dye or a combination thereof as the second colorant. Examples of the pigments and dyes include the pigments and dyes described above for the first colorant, and among these, color pigments are preferred, and phthalocyanine pigments such as copper phthalocyanine are more preferred.

With respect to the preferred dispersed form, the average particle diameter and the amount of the pigment, and the amount of the dye, the descriptions presented above for the first ink may also apply to the second ink. When the second ink contains a pigment, a pigment dispersant may also be added. Examples of the pigment dispersant include the dispersants described for the first ink, and with respect to the preferred amount of the pigment dispersant, the descriptions presented above for the first ink may also apply to the second ink.

The second ink preferably contains a non-aqueous solvent.

There are no particular limitations on the non-aqueous solvent contained in the second ink. For example, the solvents described for the non-aqueous solvent of the first ink may be used. In the second ink, a single non-aqueous solvent may be used alone, or a combination of two or more solvents may be used, provided the solvents form a single phase.

The second ink preferably contains a non-aqueous solvent with which the surface tension of the second ink can be 27.0 mN/m or greater.

The second ink preferably contains at least one solvent selected from the group consisting of ester-based solvents such as fatty acid ester-based solvents, higher alcohol-based solvents, petroleum-based hydrocarbon solvents, higher fatty acid-based solvents, glycol ether-based solvents, amine-based solvents and allyl ether-based solvents, and more preferably contains at least one solvent selected from the group consisting of fatty acid ester-based solvents, higher alcohol-based solvents, petroleum-based hydrocarbon solvents, higher fatty acid-based solvents, and glycol ether-based solvents.

In those cases where the second ink contains at least one solvent selected from the group consisting of fatty acid ester-based solvents, higher alcohol-based solvents, petroleum-based hydrocarbon solvents, higher fatty acid-based solvents and glycol ether-based solvents, the amount of those solvents in the second ink, relative to the total mass of non-aqueous solvent in the second ink, is preferably at least 40% by mass, more preferably at least 50% by mass, even more preferably at least 60% by mass, and even more preferably at least 70% by mass, and for example, may be 100% by mass, or not more than 100% by mass.

In those cases where the second ink contains at least one solvent selected from the group consisting of fatty acid ester-based solvents, higher alcohol-based solvents, petroleum-based hydrocarbon solvents, higher fatty acid-based solvents and glycol ether-based solvents, the amount of those solvents relative to the total mass of second ink varies depending on the amount of non-aqueous solvent used, but is preferably at least 40% by mass, more preferably at least 50% by mass, even more preferably at least 60% by mass, and even more preferably at least 70% by mass, and for example, is typically not more than 95% by mass.

The second ink may, for example, contain a silicone oil, but the amount of the silicone oil in the second ink, relative to the total mass of non-aqueous solvent in the second ink, is preferably not more than 70% by mass, more preferably not more than 50% by mass, even more preferably not more than 40% by mass, and for example, may be 0% by mass.

The amount of non-aqueous solvent in the second ink, relative to the total mass of the second ink, is preferably at least 40% by mass, more preferably at least 60% by mass, and even more preferably 80% by mass or greater. The amount of non-aqueous solvent in the second ink relative to the total mass of the second ink is, for example, typically not more than 95% by mass.

The second ink may also include one or more of various additives, provided these additives do not impair the effects of the present invention.

Examples of these additives include the additives described for the first ink.

The second ink can be produced using the production method described for the first ink. With respect to the preferred viscosity range, the descriptions presented above for the first ink may also be applied to the second ink.

From the viewpoint of the sharpness of fine text, the surface tension of the second ink is preferably 27.0 mN/m or greater. The surface tension of the second ink is more preferably 27.5 mN/m or greater. The surface tension of the second ink may be, for example, typically less than 40 mN/m.

Although there are no particular limitations on the color of the second ink, a cyan ink, yellow ink or magenta ink is preferable.

The method for producing a printed item according to the present embodiment is a method for producing a printed item including discharging two or more inks including the first ink and the second ink by an inkjet method toward a recording medium to form an image, wherein the method includes discharging the first ink toward the recording medium at a discharge volume of at least 20 pl per one liquid droplet to form dots with the first ink, and subsequently discharging the second ink toward the recording medium at a discharge volume of less than 20 pl per one liquid droplet so as to overlap with the dots formed with the first ink (hereafter, which may also be referred to as "step A").

There are no particular limitations on the inkjet method used, and any of various printing systems, including a piezo system, electrostatic system or thermal system may be used, but a piezo system is preferred. In those cases where an inkjet recording device is used, the inks of embodiments of the present invention are preferably discharged from the inkjet head based on a digital signal, with the discharged ink droplets being adhered to the recording medium.

In step A, the first ink is discharged toward the recording medium at a discharge volume of at least 20 pl per one liquid droplet, and the second ink is discharged toward the recording medium at a discharge volume of less than 20 pl per one liquid droplet so as to overlap with the dots formed with the first ink.

From the viewpoint of improving the sharpness of fine text, the discharge volume per one liquid droplet of the first ink is preferably at least 20 pl. The discharge volume per one liquid droplet of the first ink is more preferably 22 pl or greater. The discharge volume per one liquid droplet of the first ink may be, for example, typically not more than 50 pl.

From the viewpoints of show-through suppression and the sharpness of fine text, the discharge volume per one liquid droplet of the second ink is preferably less than 20 pl. The discharge volume per one liquid droplet of the second ink is more preferably 18 pl or less. The discharge volume per one liquid droplet of the second ink is preferably at least 1 pl, and more preferably at least 5 pl.

The total of the discharge volume per one liquid droplet of the first ink and the discharge volume per one liquid droplet of the second ink varies depending on factors such as the resolution and the image being formed, but is preferably at least 24 pl, more preferably at least 28 pl, and even more preferably 30 pl or greater.

For example, when a solid image is to be formed at a resolution of 300 dpi×300 dpi, the total of the discharge volume per one liquid droplet of the first ink and the discharge volume per one liquid droplet of the second ink is preferably at least 30 pl. On the other hand, when fine text of a small size of about 6 points is to be formed at a resolution of 300 dpi×300 dpi, the total of the discharge volume per one liquid droplet of the first ink and the discharge volume per one liquid droplet of the second ink is preferably at least 24 pl, and more preferably 28 pl or greater.

From the viewpoints of better suppressing show-through and further improving the sharpness of fine text, the total of the discharge volume per one liquid droplet of the first ink and the discharge volume per one liquid droplet of the second ink is preferably not more than 60 pl, and is more preferably 54 pl or less.

The ratio of the discharge volume per one liquid droplet of the second ink relative to the discharge volume per one liquid droplet of the first ink is preferably at least 0.05, more preferably at least 0.10, and even more preferably 0.15 or greater. The ratio of the discharge volume per one liquid droplet of the second ink relative to the discharge volume per one liquid droplet of the first ink is, for example, preferably not more than 0.90, and is more preferably 0.80 or less.

In step A, it is preferable that the first ink is discharged toward the recording medium, and the second ink is discharged toward the recording medium so as to overlap with the dots formed with the first ink. Here, the expression that the dots "overlap" means that at least a portion of the dots overlap with one another.

Examples of the method used for discharging the second ink toward the recording medium so as to overlap with the dots formed with the first ink, for example in the case of inkjet printing using a line head, include a method in which after the first ink is discharged, the second ink is discharged in accordance with the speed at which the recording medium is moving, whereby the impact positions for the liquid droplets of the first ink and the impact positions for the liquid droplets of the second ink can be matched.

There are no particular limitations on the color combination of the first ink and the second ink. For example, the first ink may be a black ink, and the second ink may be a cyan ink, a yellow ink, or a magenta ink.

In the production method of the present embodiment, an image is formed by discharging two or more inks by an inkjet method toward a recording medium. In addition to discharging the first ink and the second ink under prescribed conditions, one or more other inks may also be used.

In the present embodiment, there are no particular limitations on the recording medium, and examples of media that can be used include printing papers such as plain papers, coated papers and specialty papers, cloth, inorganic sheets, films and OHP sheets, and adhesive sheets having one of the above media as a base material and having an adhesive layer provided on the rear surface. Among these, from the viewpoint of ink penetration, a printing paper such as a plain paper or a coated paper can be used particularly favorably.

Here, plain paper describes a normal paper in which an ink receiving layer or film layer or the like has not been formed on the surface of the paper. Examples of plain papers include high-quality papers, medium-quality papers, PPC papers, woody papers and recycled papers. In a plain paper, paper fibers with a thickness of several µm to several tens of µm are formed with a spacing between fibers of several tens to several hundred µm, and therefore the ink can penetrate readily.

Further, in terms of coated papers, coated papers designed for inkjets, such as matte papers, glossy papers and semi-glossy papers, and other so-called coated printing papers can be used favorably. A coated printing paper describes the type of paper that has conventionally been used in relief printing, offset printing, and gravure printing and the like, and is a printing paper in which a coating layer is formed on the surface of a high-quality paper or medium-quality paper using a coating material containing an inorganic pigment such as clay or calcium carbonate and a binder such as starch. Depending on the amount applied of the coating material and the coating method used, coated printing papers are classified into fine coated papers, high-quality lightweight coated papers, medium-quality lightweight coated papers, high-quality coated papers, medium-quality coated papers, art papers, and cast coated papers and the like.

EXAMPLES

<Preparation of Inks>

Ink formulations are shown in Tables 2 and 3.

The pigments, pigment dispersants, and the various solvents shown in each of the tables were mixed together in accordance with the amounts shown in each table, and in each case, the pigment was dispersed thoroughly using a beads mill (Dyno-Mill KDL-A, manufactured by Shinmaru Enterprises Corporation) under conditions including a residence time of 15 minutes. Subsequently, coarse particles were removed with a membrane filter to obtain the ink.

In Tables 2 and 3, the numerical value shown for each component represents a "% by mass" value.

The materials used were as follows.

1. Pigments

MA8: "MA8", manufactured by Mitsubishi Chemical Corporation (a carbon black)

LA5380: "FASTOGEN Blue LA5380", manufactured by DIC Corporation (copper phthalocyanine blue, a cyan pigment)

Toner Magenta E: "Toner Magenta E", manufactured by Clariant Japan K.K. (dimethylquinacridone, a magenta pigment)

Yellow No. 43: "YELLOW No. 43", manufactured by Dainichiseika Color & Chemicals Mfg. Co., Ltd. (monoazo yellow, a yellow pigment)

2. Pigment Dispersants

S1800: "Solsperse 18000", manufactured by The Lubrizol Corporation (a fatty acid amine-based dispersant, solid fraction: 100% by mass)

3. Non-Aqueous Solvents

SS-3408: "SS-3408", manufactured by Dow Corning Toray Co., Ltd. (caprylyl methicone) (an alkyl-modified silicone oil)

Solvent A: synthesized below (an alkyl-modified silicone oil)

Solvent B: synthesized below (an alkyl-modified silicone oil)

KF-96L-5CS: "KF-96L-5CS", manufactured by Shin-Etsu Chemical Co., Ltd. (a dimethylpolysiloxane) (a chain-like silicone oil))

DC345 Fluid: "DC345 Fluid", manufactured by Dow Corning Toray Co., Ltd. (a cyclic silicone oil)

KAK NDO: "KAK NDO", manufactured by Kokyu Alcohol Kogyo Co., Ltd. (neopentyl glycol diethylhexanoate) (a fatty acid ester-based solvent)

Exxsol D-130: "Exxsol D130", manufactured by Exxon Mobil Corporation (a petroleum-based hydrocarbon solvent)

Decanol: manufactured by Tokyo Chemical Industry Co., Ltd. (a higher alcohol-based solvent)

Triethylene glycol monobutyl ether: manufactured by Tokyo Chemical Industry Co., Ltd. (a glycol ether-based solvent)

The surface tension values for the inks and solvents shown in the Tables 2 and 3 were determined using the Science Line t60 device manufactured by SITA Process Solutions of SITA Messtechnik GmbH, under measurement conditions including 23° C. and 0.05 Hz.

<Synthesis of Solvent A and Solvent B>

A four-necked flask was charged with 50 parts by mass of hexane, 10 parts by mass of 1,1,1,3,5,5,5-heptamethyltrisiloxane and 9.6 parts by mass of 1-tetradecene. Subsequently, 0.02 parts by mass of a platinum catalyst (1,3-divinyl-1,1,3,3-tetramethyldisiloxane platinum complex, manufactured by Sigma-Aldrich Corporation) was added dropwise to the flask, and the resulting mixture was stirred at room temperature for 2 to 3 hours. The reaction solvent (hexane) and any unreacted raw materials were then removed by distillation under reduced pressure to obtain a target compound "solvent A" (tetradecyl methicone).

With the exception of blending the siloxane raw material and the reactive compound in accordance with the formulation shown in Table 1, a "solvent B" was synthesized in the same manner as described above.

In the synthesis of the solvent A, the molar ratio between the siloxane compound and the reactive compound was 1:1.1. In the synthesis of the solvent B, the molar ratio between the siloxane compound and the reactive compound was 1:2.2.

The 1,1,1,3,5,5,5-heptamethyltrisiloxane, 1,1,3,3-tetramethyldisiloxane, and the reactive compounds shown in Table 1 can be obtained from Tokyo Chemical Industry Co., Ltd.

TABLE 1

| | Siloxane compound Raw material | (parts by mass) Blend amount | Reactive compound Raw material | (parts by mass) Blend amount |
|---|---|---|---|---|
| Solvent A | 1,1,1,3,5,5,5-heptamethyltrisiloxane | 10 | 1-tetradecene | 9.6 |
| Solvent B | 1,1,3,3-tetramethyldisiloxane | 10 | 1-hexene | 14.0 |

TABLE 2

| (Units: % by mass) | | Solvent surface | Ink name | | | | | | | | |
|---|---|---|---|---|---|---|---|---|---|---|---|
| | Product name | tension (mN/m) | K1 | K2 | K3 | K4 | K5 | K6 | K7 | K8 | K9 |
| Pigment | MA8 | Carbon black | 10 | 10 | 10 | 10 | 10 | 10 | 10 | 10 | 10 |
| | LA5380 | Cyan pigment | | | | | | | | | |
| | Toner Magenta E | Magenta pigment | | | | | | | | | |
| | Yellow No. 43 | Yellow pigment | | | | | | | | | |
| Pigment dispersant | S18000 | Fatty acid amine-based dispersant | 5 | 5 | 5 | 5 | 5 | 5 | 5 | 5 | 5 |
| Non-aqueous solvent | SS-3408 | Alkyl-modified silicone oil | 20.7 | 85 | 60 | 35 | 20 | | | | |
| | Solvent A | Alkyl-modified silicone oil | 22.9 | | | | | | 85 | | |
| | Solvent B | Alkyl-modified silicone oil | 22.4 | | | | | | | 85 | |
| | KF-96L-5CS | Chain-like silicone oil | 19.7 | | | | | | | | 75 |
| | DC345 Fluid | Cyclic silicone oil | 20.8 | | | | | | | | | 85 |
| | KAK NDO | Fatty acid ester-based solvent | 31.3 | | 25 | 50 | 65 | | | | |
| | Exxsol D130 | Petroleum-based hydrocarbon solvent | 28 | | | | | | | | 10 | 85 |
| | Decanol | Higher alcohol-based solvent | 29.5 | | | | | | | | |
| | Triethylene glycol monobutyl ether | Glycol ether-based solvent | 34.6 | | | | | | | | |
| | Total (Units: % by mass) | | 100 | 100 | 100 | 100 | 100 | 100 | 100 | 100 | 100 |
| | Ink surface tension (Units: mN/m) | | 19.6 | 22.2 | 24.9 | 26.5 | 21.5 | 21.0 | 19.6 | 19.7 | 27.6 |

TABLE 3

| (Units: % by mass) | | Solvent surface | Ink name | | | | | | |
|---|---|---|---|---|---|---|---|---|---|
| | Product name | tension (mN/m) | C1 | C2 | C3 | C4 | C5 | M1 | Y1 |
| Pigment | MA8 | Carbon black | | | | | | | |
| | LA5380 | Cyan pigment | 5 | 5 | 5 | 5 | 5 | | |
| | Toner Magenta E | Magenta pigment | | | | | | 5 | |
| | Yellow No. 43 | Yellow pigment | | | | | | | 5 |
| Pigment dispersant | S18000 | Fatty acid amine-based dispersant | 3 | 3 | 3 | 3 | 3 | 3 | 3 |
| Non-aqueous solvent | SS-3408 | Alkyl-modified silicone oil | 20.7 | 92 | 20 | | | | |
| | Solvent A | Alkyl-modified silicone oil | 22.9 | | | | 5 | | |
| | Solvent B | Alkyl-modified silicone oil | 22.4 | | | | | | |
| | KF-96L-5CS | Chain-like silicone oil | 19.7 | | | | | | |
| | DC345 Fluid | Cyclic silicone oil | 20.8 | | | | | | |
| | KAK NDO | Fatty acid ester-based solvent | 31.3 | | 72 | | | | |
| | Exxsol D130 | Petroleum-based hydrocarbon solvent | 28 | | | 92 | 87 | | 92 | 92 |
| | Decanol | Higher alcohol-based solvent | 29.5 | | | | | 10 | |
| | Triethylene glycol monobutyl ether | Glycol ether-based solvent | 34.6 | | | | | 82 | |
| | Total (Units: % by mass) | | 100 | 100 | 100 | 100 | 100 | 100 | 100 |
| | Ink surface tension (Units: mN/m) | | 21.0 | 28.7 | 27.8 | 27.5 | 33.3 | 27.8 | 27.8 |

<Evaluations>

Using the inks prepared above, the following evaluations were performed.

(1) Fine Text Sharpness

In each of the examples and comparative examples, the inks shown in Tables 4 to 7 were loaded into a line-type inkjet printer "ORPHIS FW5230" (manufactured by RISO KAGAKU CORPORATION), and using the order shown in Tables 4 to 7, the first ink and the second ink were discharged in order so that the impact positions of the liquid droplets of the first ink and the impact positions of the liquid droplets of the second ink were the same, and fine text was printed onto a plain paper "RISO Paper Thin Type" (manufactured by RISO KAGAKU CORPORATION) to obtain a printed item. The resolution and the discharge volume per dot for each ink were as shown in the tables. In terms of the resolution, either 300 dpi×300 dpi or 300 dpi×600 dpi was used, as indicated by an "X" in the table (with 300 dpi×300 dpi used in Examples 1 to 12, Examples 16 to 30 and Comparative Examples 1 to 6, and 300 dpi×600 dpi used in Examples 13 to 15). The obtained printed item was left to stand at room temperature for one day, and the sharpness of the fine text (6-point) was then inspected visually and evaluated against the following evaluation criteria. The results are shown in Table 4 to 7.

S: Fine text appears sharp and is easily legible
A: Fine text is legible
B: Fine text appears blurred, but is legible
C: Fine text appears blurry, and legibility is problematic (2) Solid Image Show-Through In each of the examples and comparative examples, in a similar manner to that described above in "(1) Fine Text Sharpness", the inks shown in Tables 4 to 7 were loaded into a line-type inkjet printer "ORPHIS FW5230" (manufactured by RISO KAGAKU CORPORATION), and using the order shown in Tables 4 to 7, the first ink and the second ink were discharged in order so that the impact positions of the liquid droplets of the first ink and the impact positions of the liquid droplets of the second ink were the same, and a solid image was printed onto a plain paper "RISO Paper Thin Type" (manufactured by RISO KAGAKU CORPORATION) to obtain a printed item. The obtained printed item was left to stand at room temperature for one day, and the print density of the unprinted surface (rear surface) of the printed item (namely, the rear OD value) was measured using an X-Rite eXact device (manufactured by Videojet X-Rite K.K.) and evaluated against the following evaluation criteria. The results are shown in Table 4 to 7.

S: Rear surface OD value of 0.20 or less
A: Rear surface OD value of at least 0.20 but less than 0.30
B: Rear surface OD value of 0.30 or greater

TABLE 4

| | | Example 1 | Example 2 | Example 3 | Example 4 | Example 5 | Example 6 | Example 7 | Example 8 | Example 9 | Example 10 | Example 11 | Example 12 |
|---|---|---|---|---|---|---|---|---|---|---|---|---|---|
| Discharge order | First ink | K2 | K2 | K2 | K2 | K2 | K2 | K2 | K2 | K2 | K2 | K2 | K2 |
| | Second ink | C3 | C3 | C3 | C3 | C3 | C3 | C3 | C3 | C3 | C3 | C3 | C3 |
| Discharge volume per one liquid droplet (pl) | First ink | 24 | 24 | 24 | 28 | 28 | 28 | 36 | 36 | 36 | 40 | 40 | 40 |
| | Second ink | 8 | 12 | 16 | 8 | 12 | 16 | 8 | 12 | 16 | 8 | 12 | 16 |
| | Total | 32 | 36 | 40 | 36 | 40 | 44 | 44 | 48 | 52 | 48 | 52 | 56 |
| Ratio of discharge volumes per liquid droplet (second ink/first ink) | | 0.33 | 0.50 | 0.67 | 0.29 | 0.43 | 0.57 | 0.22 | 0.33 | 0.44 | 0.20 | 0.30 | 0.40 |
| Resolution | 300 dpi × 300 dpi | X | X | X | X | X | X | X | X | X | X | X | X |
| | 300 dpi × 600 dpi | | | | | | | | | | | | |
| Evaluations | Fine text sharpness | A | A | S | A | S | S | S | S | S | S | S | A |
| | Solid image show-through | S | S | S | S | S | S | S | S | S | S | S | A |

TABLE 5

| | | Example 13 | Example 14 | Example 15 | Example 16 | Example 17 | Example 18 | Example 19 | Example 20 |
|---|---|---|---|---|---|---|---|---|---|
| Discharge order | First ink | K2 | K2 | K2 | K2 | K2 | K2 | K2 | K2 |
| | Second ink | C3 | C3 | C3 | C2 | C4 | C5 | M1 | Y1 |
| Discharge volume per one liquid droplet (pl) | First ink | 28 | 28 | 36 | 28 | 28 | 28 | 28 | 28 |
| | Second ink | 8 | 16 | 16 | 12 | 12 | 12 | 12 | 12 |
| | Total | 36 | 44 | 52 | 40 | 40 | 40 | 40 | 40 |
| Ratio of discharge volumes per liquid droplet (second ink/first ink) | | 0.29 | 0.57 | 0.44 | 0.43 | 0.43 | 0.43 | 0.43 | 0.43 |
| Resolution | 300 dpi × 300 dpi | | | | X | X | X | X | X |
| | 300 dpi × 600 dpi | X | X | X | | | | | |
| Evaluations | Fine text sharpness | A | S | S | S | S | S | A | A |
| | Solid image show-through | S | S | S | S | S | S | S | S |

TABLE 6

| | | Comparative Example 1 | Comparative Example 2 | Comparative Example 3 | Comparative Example 4 | Comparative Example 5 | Comparative Example 6 |
|---|---|---|---|---|---|---|---|
| Discharge order | First ink | K2 | K9 | K9 | K2 | K2 | K2 |
| | Second ink | C1 | C1 | C2 | C3 | C3 | C3 |
| Discharge volume per one liquid droplet (pl) | First ink | 28 | 28 | 28 | 12 | 8 | 24 |
| | Second ink | 12 | 12 | 12 | 12 | 24 | 32 |
| | Total | 40 | 40 | 40 | 24 | 32 | 56 |
| Ratio of discharge volumes per liquid droplet (second ink/first ink) | | 0.43 | 0.43 | 0.43 | 1.00 | 3.00 | 1.33 |

TABLE 6-continued

|  |  | Comparative Example 1 | Comparative Example 2 | Comparative Example 3 | Comparative Example 4 | Comparative Example 5 | Comparative Example 6 |
|---|---|---|---|---|---|---|---|
| Resolution |  | X | X | X | X | X | X |
|  | 300 dpi × 300 dpi |  |  |  |  |  |  |
|  | 300 dpi × 600 dpi |  |  |  |  |  |  |
| Evaluations | Fine text sharpness | C | C | C | C | C | B |
|  | Solid image show-through | S | A | A | S | A | B |

TABLE 7

|  |  | Example 21 | Example 22 | Example 23 | Example 24 | Example 25 | Example 26 | Example 27 | Example 28 | Example 29 | Example 30 |
|---|---|---|---|---|---|---|---|---|---|---|---|
| Discharge order | First ink | K8 | K7 | K6 | K5 | K4 | K3 | K3 | K3 | K3 | K1 |
|  | Second ink | C3 | C3 | C3 | C3 | C3 | C2 | C3 | C4 | C5 | C3 |
| Discharge volume per one liquid droplet (pl) | First ink | 28 | 28 | 28 | 28 | 28 | 28 | 28 | 28 | 28 | 28 |
|  | Second ink | 12 | 12 | 12 | 12 | 12 | 12 | 12 | 12 | 12 | 12 |
|  | Total | 40 | 40 | 40 | 40 | 40 | 40 | 40 | 40 | 40 | 40 |
| Ratio of discharge volumes per liquid droplet (second ink/first ink) |  | 0.43 | 0.43 | 0.43 | 0.43 | 0.43 | 0.43 | 0.43 | 0.43 | 0.43 | 0.43 |
| Resolution | 300 dpi × 300 dpi | X | X | X | X | X | X | X | X | X | X |
|  | 300 dpi × 600 dpi |  |  |  |  |  |  |  |  |  |  |
| Evaluations | Fine text sharpness | A | A | A | A | A | S | S | S | S | A |
|  | Solid image show-through | S | S | S | S | S | S | S | S | S | S |

As shown in the tables, in Examples 1 to 30, excellent results were achieved for both the fine text sharpness and the solid image show-through.

In contrast, in Comparative Example 1 in which the surface tension of the second ink was low, because the impact position accuracy of the second ink was low, the fine text sharpness was poor. In Comparative Example 2 in which the surface tension of the first ink was high and the surface tension of the second ink was low, and Comparative Example 3 in which the surface tension of the first ink was high, because the first ink blurred, the fine text sharpness was poor. In Comparative Example 4 in which the discharge volume per one liquid droplet of the first ink was small, and Comparative Example 5 in which the discharge volume per one liquid droplet of the first ink was small and the discharge volume per one liquid droplet of the second ink was large, because the discharge volume of the first ink was small, the fine text sharpness was poor. In Comparative Example 6 in which the discharge volume per one liquid droplet of the second ink was large, the large discharge volume of the second ink increased blurring and penetration of the second ink, and therefore the fine text sharpness and the solid image show-through results were both inferior.

It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A method for producing a printed item comprising discharging two or more inks by an inkjet method toward a recording medium to form an image, wherein the two or more inks comprise:

a first oil-based inkjet ink comprising a first colorant and a non-aqueous solvent, and having an ink surface tension of less than 27.0 mN/m at 23° C., and a second oil-based inkjet ink comprising a second colorant and a non-aqueous solvent, and having an ink surface tension of 27.0 mN/m at 23° C. or greater, and the method comprises:

discharging the first oil-based inkjet ink toward the recording medium at a discharge volume of at least 20 pl per one liquid droplet to form dots with the first oil-based inkjet ink, and subsequently discharging the second oil-based inkjet ink toward the recording medium at a discharge volume of less than 20 pl per one liquid droplet so as to overlap with the dots formed with the first oil-based inkjet ink.

2. The method for producing a printed item according to claim 1, wherein a surface tension of the first oil-based inkjet ink is at least 22.0 mN/m but not more than 26.0 mN/m at 23° C.

3. The method for producing a printed item according to claim 1, wherein a total of the discharge volume per one liquid droplet of the first oil-based inkjet ink and the discharge volume per one liquid droplet of the second oil-based inkjet ink is not more than 60 pl.

4. The method for producing a printed item according to claim 1, wherein the non-aqueous solvent of the first oil-based inkjet ink comprises at least 15% by mass of a silicone oil relative to a total mass of the non-aqueous solvent.

5. The method for producing a printed item according to claim 1, wherein the non-aqueous solvent of the second oil-based inkjet ink comprises at least 15% by mass of at least one selected from the group consisting of a fatty acid ester-based solvent, a higher alcohol-based solvent, a petroleum-based hydrocarbon solvent, a higher fatty acid-based solvent and a glycol ether-based solvent, relative to a total mass of the non-aqueous solvent.

6. The method for producing a printed item according to claim 1, wherein the first oil-based inkjet ink is a black ink, and the second oil-based inkjet ink is a cyan ink, a yellow ink, or a magenta ink.

* * * * *